United States Patent [19]
Collins et al.

[11] Patent Number: 6,159,363
[45] Date of Patent: Dec. 12, 2000

[54] WATER CARAFE FILTER CARTRIDGE

[75] Inventors: Thomas A. Collins, Horseheads; Willard A. Cutler; David L. Hickman, both of Big Flats; Alfred N. Mack, Corning, all of N.Y.

[73] Assignee: Corning Incorporated, Corning, N.Y.

[21] Appl. No.: 09/293,015

[22] Filed: Apr. 16, 1999

Related U.S. Application Data

[60] Provisional application No. 60/083,724, Apr. 30, 1998.

[51] Int. Cl.[7] .................................................. B01D 35/153
[52] U.S. Cl. ......................... 210/136; 210/248; 210/266; 210/433.1; 210/472; 210/473
[58] Field of Search ..................................... 210/136, 266, 210/282, 284, 464, 472, 473, 474, 476, 248, 433.1, 434, 97, 120, 436; 222/189.06, 189.08

[56] References Cited

U.S. PATENT DOCUMENTS

| | | | |
|---|---|---|---|
| 5,076,922 | 12/1991 | Deare | 210/282 |
| 5,562,824 | 10/1996 | Magnusson | 210/266 |
| 5,830,360 | 11/1998 | Mozayeni | 210/266 |

FOREIGN PATENT DOCUMENTS

| | | |
|---|---|---|
| 2197647 | 3/1990 | United Kingdom . |
| 96/31440 | 10/1996 | WIPO . |

*Primary Examiner*—Joseph W. Drodge
*Attorney, Agent, or Firm*—Kees van der Sterre

[57] ABSTRACT

A gravity-flow water filter cartridge for use in a drinking water carafe or the like includes a high-surface area cyst reduction filter element disposed in a water-retaining reservoir within the cartridge; the reservoir retains sufficient water between filtering and during dispensing cycles to maintain the filter element in a fully immersed state, whereby the primed (air-free) condition of the filter necessary for fast gravity flow at high cyst reduction efficiency is maintained.

13 Claims, 4 Drawing Sheets

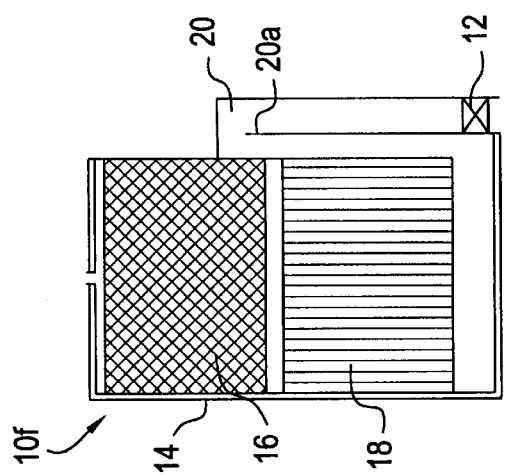
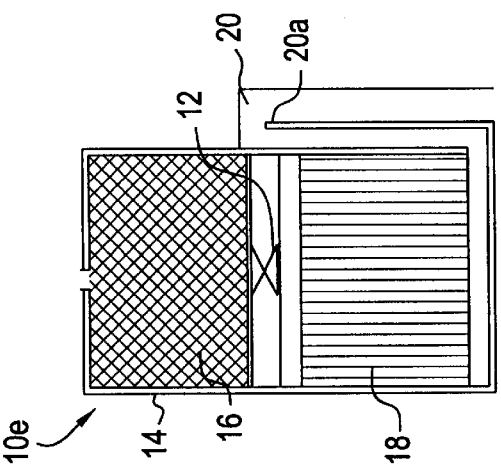
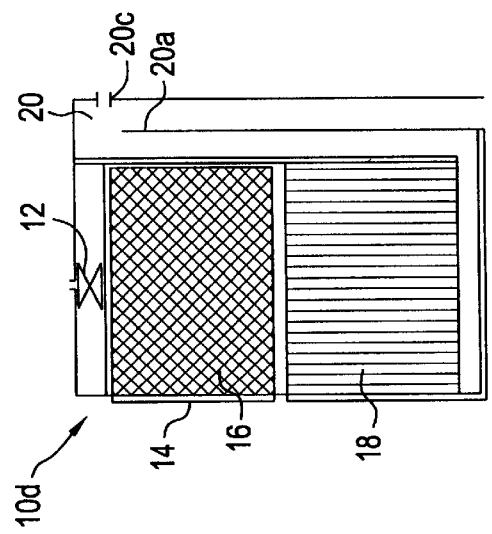

WATER CARAFE FILTER CARTRIDGE

This application claims the benefit of U.S. Provisional Application Ser. No. 60/083,724, filed Apr. 30, 1998, entitled "Water Carafe Filter Cartridge", by Collins et al.

BACKGROUND OF THE INVENTION

Gravity flow carafe filters have been commercially available for several years and their popularity with consumers continues to grow. Currently available commercial water carafes are capable of removing lead using an ion exchange resin, undesirable tastes and odors using carbon granules, and large particles using a packed bed configuration. However, up to the present time, water carafes of commercially available design have not been capable of parasite reduction, which requires much finer filtration. Nor have they been effective for the complete removal of organic chemicals, pesticides and insecticides, which requires more carbon. While such additional removal attributes are desirable, they have not been technically feasible in the filter sizes required and at the filter cost currently in the market.

The need for additional carafe functionality has been recognized and proposals to add parasite reduction capabilities have been made. A major problem to be solved for carafe applications, however, is that of achieving an adequate filter flow rate. Unlike filter cartridges for in-line or pressurized water filtration systems, cartridges for carafes must operate under water pressures developed by gravity alone. Membranes and other micro-porous filter materials with porosity sufficiently fine to exhibit cyst reduction capability have for the most part been viewed as exhibiting inadequate flow rates for systems other than those using a high-pressure water supply.

SUMMARY OF THE INVENTION

The present invention provides a gravity-flow water carafe filter with the capability of substantially removing parasites in the cyst stage, while still maintaining an adequate filter flow and a reasonable filter size. The invention is based in part on the discovery that micro-porous filtration materials previously considered useful only in pressurized water filtration systems function very effectively in a gravity flow environment, if properly maintained. In particular, many of the micro-porous filter materials previously used only in pressurized systems have been found to exhibit good gravity flow characteristics if maintained in an adequately primed condition throughout the period of use.

This finding is contrary to experience gained through the study of more conventional carafe filter designs. In general, the latter filters will demonstrate acceptable water flow rates once thoroughly wetted, and as long as they are kept somewhat moist in use. In fact, the presence of substantial air pockets within the filter beds of these filters, even during periods of high water flow, is common and not considered to be detrimental to filter performance.

In contrast, for micro-porous filter materials capable of cyst reduction performance we have found that sustaining high gravity-only flow rates throughout the useful life of the filter requires maintaining the filter element in a fully primed condition during the entire period of filter use. The primed condition is a condition under which substantially all of the air residing in the pore structure of the porous filter element has been expelled and replaced with water.

Maintaining a fully primed condition, i.e., preventing air access to the primed filter, is central to the invention. Allowing air access permits allows blocking air inclusions removed during priming to re-form in the filter pore structure, significantly reducing flow until the primed condition is re-established. The advantage of maintaining the prime extends to essentially any micro-porous filter medium regardless of composition, including ceramic, carbon, or polymer membranes or filter bodies of inorganic or organic composition.

An important aspect of the invention, therefore, is the use of a filter cartridge design that keeps the filter media completely submerged in water, so that air inclusions in the filter cannot re-form. The use of such a design has been found very effective to insure consistently high gravity flow rates for filter media of sufficiently fine pore structure to provide parasite filtration.

One specific embodiment of the invention, then, is a gravity-flow water filter cartridge that includes a water-retaining reservoir within which the micro-porous high-surface-area cyst reduction filter element for the filter cartridge is disposed. The reservoir has a retained water capacity sufficient to at least cover the cyst reduction filter element when the cartridge is in an upright orientation.

Preferably, the reservoir configuration is such as to retain a quantity of water within the cartridge at a level at least sufficient to cover the filter element, with coverage being maintained over a range of cartridge tilt angles from upright (0 degrees) to at least 90 degrees from the upright orientation in at least one tilting direction. For purposes of the present description, upright orientation for a filter cartridge is the filtering orientation in which the cartridge is held when mounted for effective water filtration in a water carafe standing on its base. This is a vertical orientation permitting water being filtered to flow generally downwardly through the cartridge under the force of gravity alone from a reservoir for raw water positioned above the cartridge inlet to a treated water reservoir positioned below it.

A particularly preferred embodiment of the filter design of the invention is a gravity-flow filter cartridge comprising the micro-porous filter in combination with other water-purifying elements. Thus the cartridge will comprising a filter housing for the various purifying elements, these elements comprising activated carbon adsorbents, ion-exchange resins or compounds, and/or polymer or ceramic filtering elements. The filter housing is adapted for mounting in a vertical or filtering orientation within a holder for the cartridge in a water carafe.

At least one of the filtration elements in the cartridge is a micro-porous water filtration element having a pore structure sufficiently fine to provide cyst reduction capability. To prevent air blocking of this element, the filter housing incorporates means for preventing air contact with the element while the filter housing is in a tipped or pouring orientation, as well as while it is in the filtering orientation. In general, such means operate to retain a sufficient reservoir of water around the micro-porous filter element that the element remains immersed in water under all of the ordinarily encountered orientations assumed by the filter housing during filling, pouring, and other normal uses of the carafe.

In addition to rapid and effective parasite reduction, provided by the primed micro-porous filter element, the preferred filter cartridges of the invention have the capability to remove a variety of other impurities from raw water. Thus these cartridges typically include additional water-purifying elements such as resins, carbon or silicate adsorbents, and coarse filters. Any of these conventional elements may be included in the cartridge for the removal of inorganic particulates, tastes and odors arising from organic or inorganic impurities, organic solvent fractions or pesticide residues, and ionic impurities such as lead and iron.

BRIEF DESCRIPTION OF THE DRAWINGS

The invention may be further understood by reference to the drawings, wherein:

FIGS. 2a–2c are schematic elevational views of some additional cartridge designs;

DETAILED DESCRIPTION

Figure 1A:
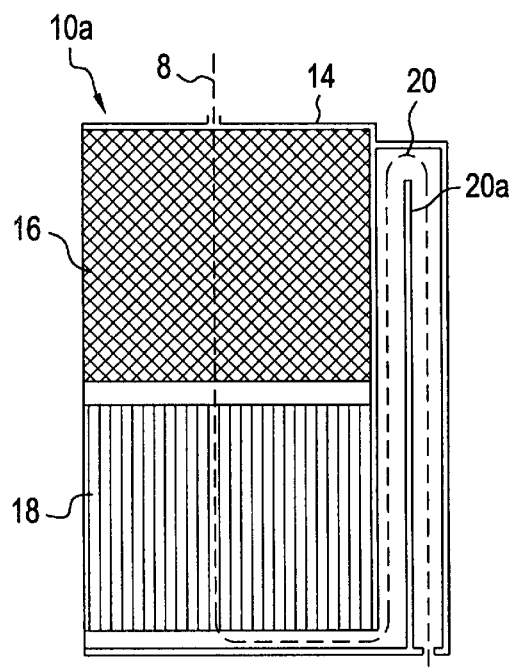
FIGS. 1a–1d are schematic elevational views of basic cartridge designs according to the invention.

In a preferred embodiment, the filter cartridge of the invention is composed of four constituents. These may be provided separately, or in some cases combined in the same element. They include: (a) an ion exchange medium (to remove lead and soften water); (b) activated carbon (to remove tastes and odors and, if present in sufficient quantities, organic chemicals); (c) a high-surface-area micro-porous filter element for parasite (cyst) reduction; and (d) a filter housing incorporating means for retaining water around the filter element during normal cartridge use. Optionally, the cartridge may include a pre-filter located in front of (upstream from) the micro-porous filter element with respect to the direction of water flow. This pre-filter can serve to prevent clogging of the micro-porous filter element in cases where the raw water contains significant concentrations of visible particulates.

The first two constituents, i.e., ion exchange media and activated carbon, may if desired be included in the form of conventional powders, beads or granules of the types used in prior art water carafe filter cartridges. These are commercially available.

The third constituent of the cartridge is a high-surface-area micro-porous filter element. This element may be formed of any of a variety of different materials that offer porosity sufficiently fine to provide effective cyst reduction. The structure must, however, offer high surface area in order that adequate water filtration rates under gravity force alone are secured. Examples of materials that can be formed into filter elements of the requisite porosity and surface area are porous ceramics, porous carbon, composite materials of organic/organic, organic/inorganic or inorganic/inorganic composition, and polymer or molecular sieve membranes.

Among the various useful filter types are certain carbon-containing porous ceramic honeycomb structures, made as generally described in U.S. Pat. No. 5,597,617 and suitably plugged to provide high-surface-area wall-flow filters as generally described in published European Patent application EP 0754416. The co-pending, commonly assigned U.S. provisional patent application of W. Cutler et al., Ser. No. 60/068124 filed Dec. 19, 1997 now pending as patent application Ser. No. 09/211,134 filed on Dec. 14, 1998, describes certain porous high-surface-area ceramic filter elements useful for cyst reduction in water carafe or other gravity flow systems, and that application is expressly incorporated herein by reference for a further description of this particular type of filter.

Since maintaining the micro-porous filter element in a primed condition is critical to the invention, the design of the filter housing is of particular importance. It is in fact the filter housing which enables the other elements, particularly the high surface area filter element, to be effectively used in a gravity flow water filtration environment.

The preferred practice of the invention involves placing the purification elements of filter cartridge into the cartridge housing, and then permanently priming the high-surface-area micro-porous filter element to replace air from the pores of the filter with water. The high surface area media is from then on kept completely submerged in water (not just kept moist or wet) throughout the period of normal use. Since normal use comprises carafe filling, filtering and pouring, the means provided for maintaining filter immersion must be operable over a range of cartridge orientation angles. These range from upright or vertical orientation (i.e., the orientation of the cartridge when mounted in a carafe sitting on its base) to the tilted orientation assumed by the cartridge when the carafe is pouring. This will typically involve a cartridge tilt angle of at least 90°; more preferable is a cartridge design that maintains filter immersion from the vertical through a tilt angle of at least 150° in at least one tilt direction.

In some cases, as where priming of the cartridge is carried out as part of the manufacturing process, the cartridge will be shipped and stored in a pre-primed condition. Since in these cases the cartridge may assume any orientation, the cartridge will typically be provided with temporary seals applied to the inlet and outlet ports to prevent air access to the micro-porous filter element.

The path of water flow through the cartridge is not critical to the invention. The flow path may be convoluted or direct, and include flow-path segments directed upwardly (against gravity), laterally, downwardly, or in various combinations thereof. Further, the cartridge housing may, in addition to raw water inlet and treated water outlet openings, include such features as a main filtration chamber, various water transfer passages, air vents, water valves and/or tubing. These will be designed to control water flow within the cartridge and, most importantly, to prevent exposure of the micro-porous filtration medium to air in both the upright and tilted cartridge orientations.

FIGS. 1a–1d present schematic elevational cross-section views of four differently designed filter cartridges, illustrating some of the various water flow patterns useful in gravity flow cartridges provided according to the invention. In FIG. 1a, water enters filter cartridge 10a via gravity flow in the direction of arrow 8 through a vented top surface in cartridge housing 14. It then flows downwardly through an ion-exchange bed 16 and a micro-porous filter element 18 located in the main chamber of housing 14 before entering an outlet conduit 20 formed within the cartridge. Conduit 20 is a trap outlet conduit of "gooseneck" configuration, and it provides an overflow discharge path for the release of filtered water from the cartridge. The configuration of conduit 20 insures that, during and after filtration, the level of water within housing 14 will be maintained at the height of sill 20a. Thus micro-porous filter element 18 will be maintained in a submerged and primed condition even after the flow of water through the cartridge ceases.

Figure 1B:
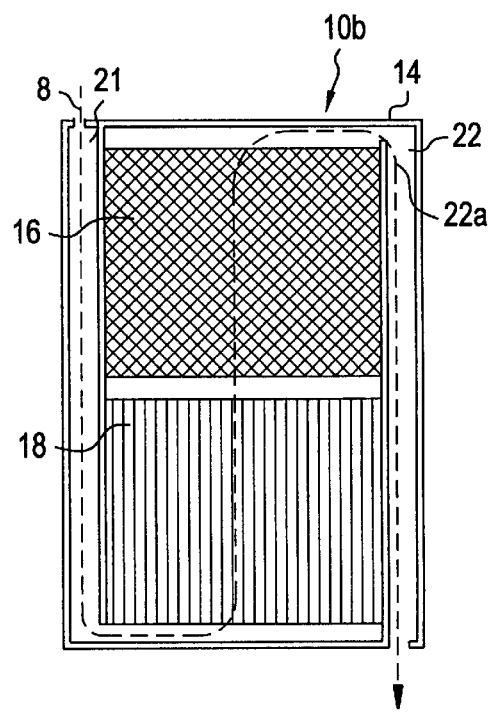

In FIG. 1b, raw water enters cartridge 10b in the direction of arrow 8 through inlet conduit 21, then entering the base of housing 14 beneath micro-porous filter element 18. It then flows upwardly through filter element 18 and ion-exchange bed 16 to exit the main chamber of housing 14 via overflow discharge conduit 22. The height of sill 22a in discharge conduit 22 insures that the main chamber of housing 14 will remain full and filter element 18 submerged.

Figure 1C:
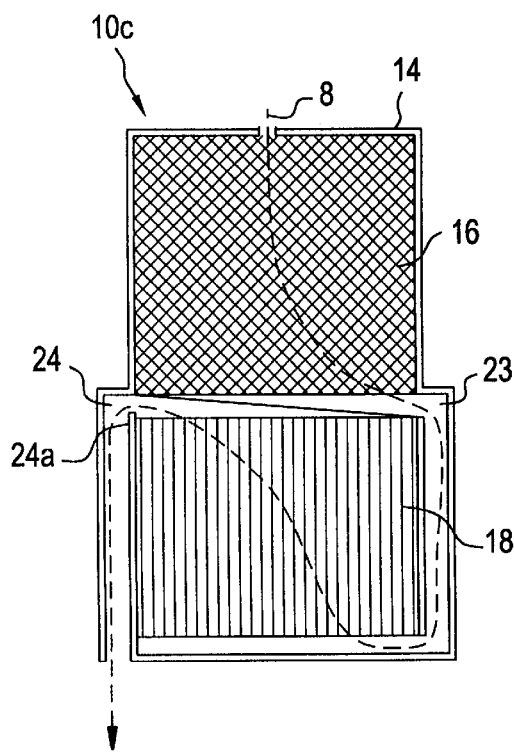

FIG. 1c illustrates a cartridge design that combines both upward and downward water flows in a single housing. Raw water initially enters housing 14 of cartridge 10c by gravity flow through a top vent in the housing, then filtering downwardly through ion exchange bed 16. The ion-exchanged water then exits the upper portion of the main housing chamber via by-pass conduit 23, entering the bottom of the lower portion of housing 14 beneath micro-porous filter element 18. Under the pressure of the water head in the ion exchange bed and conduit 23, water being filtered then flows upwardly through filter element 18 and exits the cartridge housing via overflow outlet conduit 24. Again, sill 24a in outlet conduit 24 insures that water sufficient to keep filter element 18 submerged is retained in the cartridge even after the flow of raw water from conduit through the lower portion of housing 14 ceases.

Figure 1D:
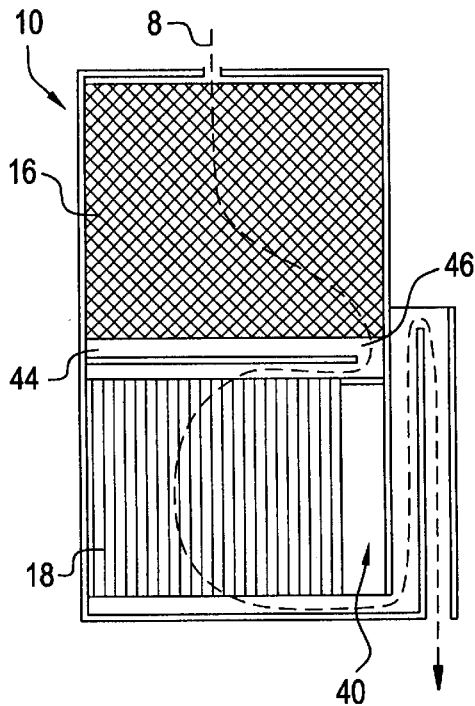

In FIG. 1d, a baffle 44 is positioned within housing 14 of cartridge 10 between filter element 18 and upstream water treating elements such as ion-exchange bed 16. The baffle allows water flow into the filter element section of the housing only through an opening 46 located at a point in the baffle opposite the side of the cartridge toward which tipping of the cartridge will occur in use. To further improve priming protection at high tipping angles, micro-porous filter element 18 is offset away from the baffle opening toward the tipping side of the cartridge by inserting dead space 40 in the filter chamber beneath the baffle opening. Draining of the filter chamber is then prevented until a tilt angle sufficient to raise at least some portion of the filter element above the level of the baffle opening is reached.

The filter cartridges of the invention may additionally employ one or more flow control valves at various locations within the housing, to further reduce the likelihood of air access to the micro-porous filter element in use. The valves may be simple mechanisms such as float valves, check valves, or flapper valves, or they may be manually operated valves actuated, for example, by the user as pouring and tilting of the cartridge is initiated. Again, just as in the case of the active cyst filter and other purifying elements contained within the cartridge, the location of the individual valve, conduit, or other flow control means within the cartridge is not critical as long as the arrangement is such as to preserve the prime of the micro-porous cyst reduction element in use.

Examples of specific element arrangements and valves useful in conjunction with filter cartridges provided in accordance with the invention are illustrated in schematic elevational cross-section in FIGS. 2a–2c. Filter cartridge 10d shown in FIG. 2a has an arrangement of components similar to the arrangement of the cartridges in FIGS. 1a–1c, except that water entering the cartridge through a top vent in housing 14 flows through check valve 12 before entering the main filtering chamber of the cartridge. Check valve 12 operates to prevent draining of the main chamber containing cyst filter 18 when the filter cartridge is tipped with a carafe containing it during pouring. Thus, in both filtering and pouring orientations of the cartridge, a reservoir of water is maintained in main chamber by the combined action of overflow conduit 20 and check valve 12 which effectively prevents air access to the filter element in use.

The design of the filter cartridge of FIG. 2b is similar to that of FIG. 2a, except that the location of check valve 12 in cartridge 10e has been moved to a point between ion-exchange bed 16 and micro-porous filter element 18. Again however, sill 20a in trap outlet 20 is of a height such that water sufficient to cover filter element 18 is retained in the bottom portion of the housing while the cartridge is in a vertical or filtering orientation. Thus check valve 12 is effective to prevent emptying of the critical bottom portion of housing 14 when the cartridge is tipped for pouring.

In the design of filter cartridge 10f in FIG. 2c, check valve 12 has been moved to a point within trap outlet 20. The function of the check valve in this design is to maintain the trap outlet in a filled condition so that air does not have to be expelled from the outlet during each fill cycle. The placement of the check valves shown in the cartridge designs of FIGS. 2a–2c is generally effective to keep filter element 18 submerged at cartridge pouring or tilting angles of 90 degrees and in some cases up to 150 degrees or more, at least in tilting directions away from the side of the cartridge housing incorporating the discharge conduits. Of course, where tilting to more extreme angles or in other directions is anticipated, additional check valves or other water retaining means may be included in the design.

In any of the cartridge designs of FIGS. 2a–2c or 1a–1d, the discharge conduits may be vented to reduce siphoning effects which might otherwise tend to draw water from the housing. For example, FIG. 2a shows an optional vent 20c, which may be used to increase the resistance of conduit 20 to siphoning. Air vents of similar type can also be used in other locations within the cartridge as necessary to relieve air buildup.

An example of the use of a manually operated valve to protect the cartridge from air ingress in use in a water carafe would be a manual plunger connected to the cartridge adjacent the cartridge raw water inlet. This plunger would close the cartridge inlet during pouring from the carafe, preventing the release of water from the inlet and thereby avoiding the introduction of an air bubble which could lead to a loss of prime in the porous micro-filter. A button or other control means positioned on the handle of the carafe incorporating the filter, having the primary function of opening the carafe pour spout to dispense filtered water, could secondarily activate such a plunger.

As previously noted, the performance advantages of filter cartridges provided in accordance with the invention are not limited to micro-porous filter elements of any particular class. In fact, advantages may be seen even in the case of micro-porous polymer membrane filter types which until recently have been used mainly only in pressurized or "in-line" cyst reduction filtration systems. Among the micro-porous filters known to be effective for cyst reduction during water filtration are ceramic honeycomb filters, carbon-based honeycomb filters, fiber mat filters incorporating glass, ceramic and/or polymer fibers, and polymer membrane filters. For purposes of the present description, the designation of "cyst reduction filter" is limited to filters providing $\geq 99.95\%$ particle removal in standardized cyst reduction tests.

The high gravity-only flow rate potential of many filter types certified for cyst reduction has not previously been recognized, since their use has been largely limited to high-pressure filtration systems, and they have not been deployed in high-surface-area configurations such as those of EP 0745416. Also, the importance of excluding intermittent air contact with the filter, which is normal in gravity flow systems, has not been recognized.

We have found that such filters can exhibit surprisingly high initial gravity flow rates if first adequately primed to remove air from the fine pore structures of the filters.

Further, when used in the cartridge designs of the invention, gravity flow rates exceeding 95% of the original primed flow are retained by these types of filters over prolonged periods of use even though the carafe reservoir is continually being filled and emptied. The importance of prime maintenance in such cyst filters is illustrated by the fact that these same filter types can show flow rates as low as 1–20% of initial primed flow rates, if air access to the filter elements between carafe fillings is permitted. Hydrophobic (e.g. carbon or organic) cyst reduction materials are particularly susceptible to this type of damage.

Figure 3:
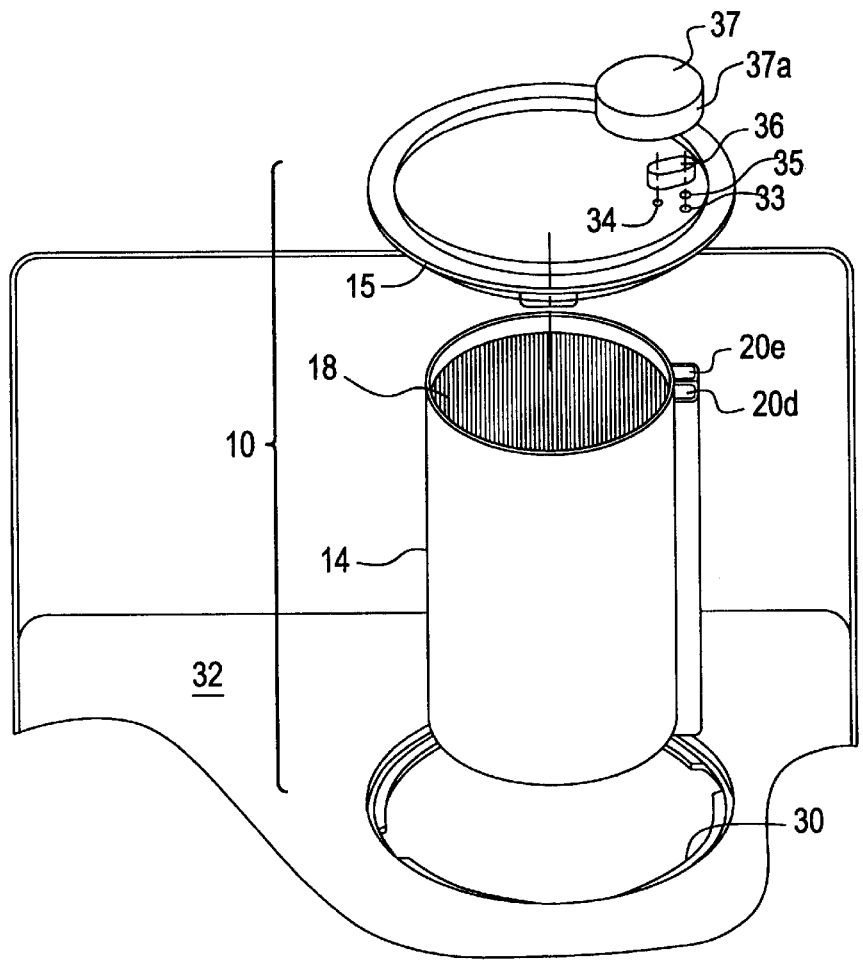
FIG. 3 is an exploded perspective view of a preferred water up-flow cartridge design.

A particular example of a filter cartridge design incorporating several of the above features is illustrated in the partially exploded perspective view of FIG. 3. As illustrated in FIG. 3, filter cartridge 10 is shown adjacent a cartridge mounting port 30 within which it will be mounted in actual use, port 30 providing an opening in the bottom of a raw water reservoir 32 (shown in partial cutaway view). Cartridge 10 comprises a base housing 14 and a main cover 15. Cover 15 is shown separate from the housing to illustrate the position of cyst reduction filter element 18 mounted in the housing. The diameter of main cover 15 is slightly larger than that of housing 14, being adapted to sealingly engage the top edge of base housing 14 as the filter, cover and housing are assembled and sealed during cartridge manufacture.

Cover 15 is fitted with a locking tab adapted to engage with a locking groove in mounting port 30 within reservoir 32. Lock mounting of the cartridge within reservoir 32 is desirable to seal the mounted assembly against raw water leakage past the cartridge in use.

To direct the flow of water through the cartridge, cover 15 is provided with three small water flow ports 33–35, these being positioned so as to establish the mode of operation of the cartridge as an up-flow filter. In use, raw water from reservoir 32 first enters the cartridge through inlet port 33 in cap 15. This water initially bypasses filter element 18, flowing downwardly through by-pass conduit 20d to exit the conduit through a side outlet in the conduit (not shown) opening into the bottom section of the main chamber of housing 14.

Due to the head pressure of the raw water in reservoir 32, raw water entering the base of housing 14 flows upwardly through the housing 14, eventually passing through filter element 18 for final filtration. It then exits the main chamber of the housing 14 via overflow port 34.

Covering ports 34 and 35 is a small flow connector 36, shown in phantom above cap 15 in the exploded view of FIG. 3. When sealed to cap 15 over ports 34 and 35 during cartridge manufacture, connector 36 functions as an elbow fitting to direct filtered water flowing upwardly through overflow port 34 into drain port 35. In the assembled cartridge, port 35 opens directly into drain conduit 20e, the latter providing a drain through which the filtered water empties from the cartridge into a filtered water reservoir of conventional design (not shown) placed beneath reservoir 32 for pure water collection. A screening cap 37, adapted to cover both connector 36 and inlet port 33 in the fully assembled cartridge, includes a screened inlet 37a which operates to remove large particulates from the raw water stream before it enters the cartridge.

One particular advantage of the cartridge assembly shown in FIG. 3, in addition to its compact design, is good resistance to air ingress at cartridge tipping angles greater than 90° from the vertical. The cap/water conduit combination shown is very effective in trapping water within housing 14 during tilting of the cartridge, thereby preventing air from infiltrating back into the filter. Best results are achieved when, as the cartridge is locked in position in a carafe, the conduit, ports, and cap fittings are located nearest the side of the cartridge diametrically opposite the side toward which cartridge tilting will occur during pouring from the carafe.

Figure 4:
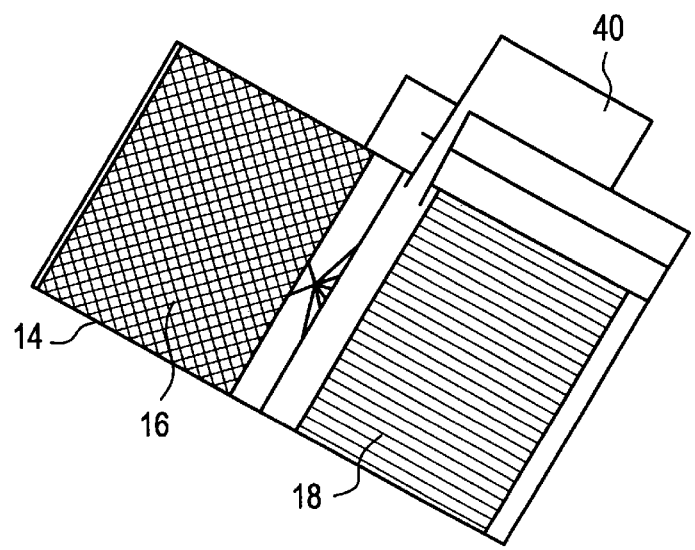
FIG. 4 is a schematic view of a cartridge-carafe combination incorporating means for restricting air access to filter elements in the cartridge.
Figure 5:
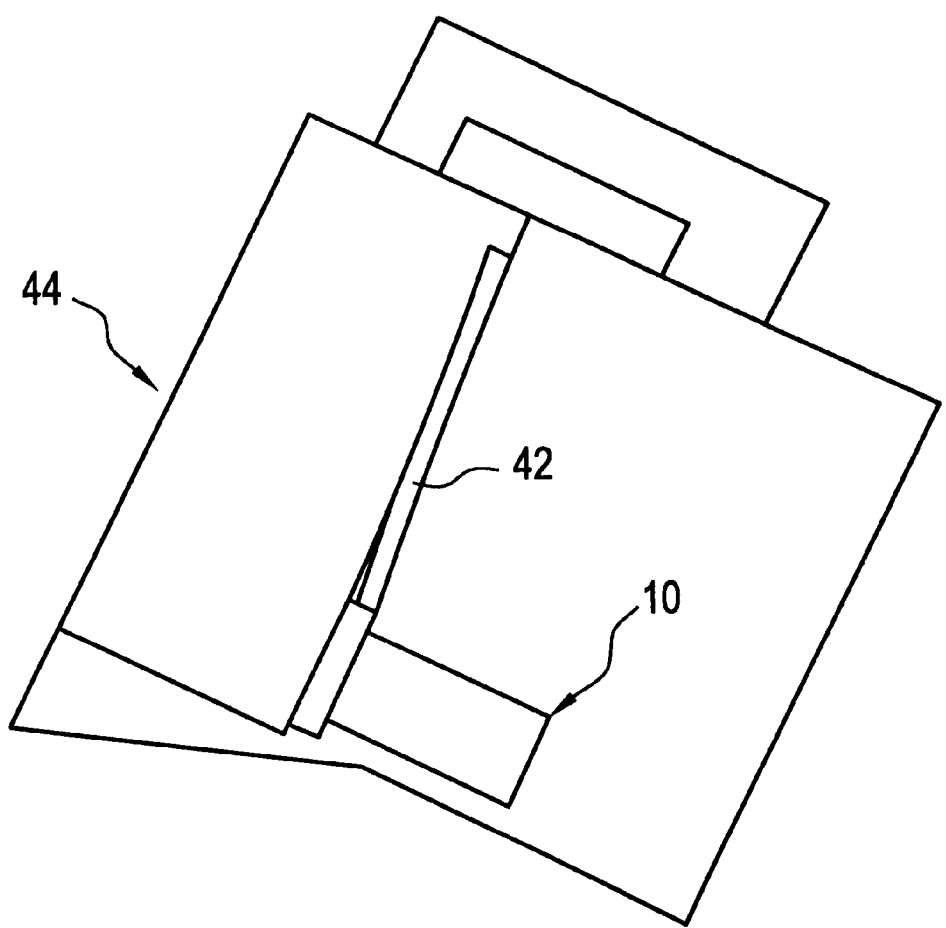
FIG. 5 is a schematic view of a further cartridge-carafe combination for restricting air access.

Other methods for mitigating the effects of air ingress are shown in FIGS. 4 and 5. In FIG. 4, an air chamber 40 is provided outside of cartridge housing 14. As the cartridge is tipped during pouring, any air bubble trapped above filter element 18 in the housing rises into the chamber and is replaced by overflow water from the chamber. In FIG. 5, a filter cartridge 10 positioned near the pour spout of a carafe 44 in which it is mounted is fitted with an extended raw water intake tube 42 terminating at a point spaced from the cartridge inlet, and well above the inlet in the tipped or water-dispensing cartridge orientation. The tube prevents water drainage from the cartridge inlet, thereby avoiding the introduction of air bubbles into the cartridge.

The cartridge designs specifically described and illustrated above are intended to be merely illustrative of designs and methods for successfully employing cyst reduction materials in gravity flow filtration systems for the purification of drinking water. Various adaptations of these designs and methods may therefore be resorted to for the same or similar purposes within the scope of the appended claims.

We claim:

1. A gravity-flow water filter cartridge comprising:
   a water-retaining reservoir; and
   a microporous cyst reduction filter element disposed in the reservoir;
   the water-retaining reservoir (i) having a retained water capacity sufficient to cover the filter element when the cartridge is in an upright orientation; and (ii) being configured to retain water at a level sufficient to cover the filter element at cartridge tilt angles ranging up to 90 degrees away from the upright orientation in at least one tilting direction.

2. A gravity-flow water filter cartridge in accordance with claim 1 wherein the cartridge includes at least one check valve, and wherein water drainage from the reservoir is restricted at cartridge tilt angles of up to 150 degrees away from the upright orientation.

3. A gravity-flow water filter cartridge in accordance with claim 1 which comprises a drain port or drain conduit having an entry point at or above the level sufficient to cover the filter element.

4. A gravity-flow water filter cartridge in accordance with claim 1 which comprises a pre-filter positioned upstream of the high-surface-area cyst reduction filter element.

5. A gravity-flow water filter cartridge in accordance with claim 1 which comprises a gooseneck drain conduit (i) having an entry point below the level sufficient to cover the filter element, and (ii) including a length portion extending to a height above said level.

6. A gravity-flow water filter cartridge in accordance with claim 5 wherein the gooseneck drain conduit includes an anti-siphon air inlet.

7. A gravity-flow water filter cartridge in accordance with claim 1 which comprises an air bubble chamber opening into the reservoir at an entry point above the level sufficient to cover the filter element, the chamber providing a collection space for air bubbles developed in the reservoir during filling or tipping of the cartridge.

8. A gravity-flow water filter cartridge in accordance with claim 1 which comprises a water entry tube attached to and extending outwardly from a water inlet port in the cartridge, the entry tube having a water entry opening which is disposed above the water inlet port when the cartridge is tipped.

9. A gravity-flow water filter cartridge for a water carafe comprising:

a filter housing incorporating one or more water purifying elements and being adapted for mounting in an upright filtering orientation within a filter cartridge holder in a water carafe;

a micro-porous water filter element disposed within the housing; and water reservoir means for preventing air contact with the micro-porous filter element when the filter housing is in an upright position and when the filter housing is in a tipped orientation for pouring;

the water purifying elements including at least one element selected from the group consisting of adsorbents and ion-exchange resins, and the filter housing comprising a base housing and a housing cover sealed thereto, the housing cover incorporating a water inlet port connected to a bypass water conduit and the bypass water conduit opening into the interior of the base housing at a point below the position of the micro-porous water filter element disposed therein.

10. A gravity flow water filter cartridge in accordance with claim 9 wherein the housing cover incorporates an overflow port for the outflow of treated water from the housing.

11. A gravity flow water filter cartridge in accordance with claim 10 wherein the overflow port is connected to a drain port in the housing cover, the drain port opening into a drain conduit disposed within but traversing the housing and having an outlet at the base of the housing for discharging treated water into a treated water reservoir disposed beneath the cartridge.

12. A gravity flow water filter cartridge in accordance with claim 9 wherein the housing cover incorporates sealing means for forming a water-tight seal between the housing and the filter cartridge holder.

13. A gravity-flow water filter cartridge in accordance with claim 9 which includes an activated carbon adsorbent.

\* \* \* \* \*

UNITED STATES PATENT AND TRADEMARK OFFICE
CERTIFICATE OF CORRECTION

PATENT NO. : 6,159,363
DATED : December 12, 2000
INVENTOR(S) : Thomas A. Collins, Willard A. Cutler, David L. Hickman, Alfred N. Mack It is certified that error appears in the above-identified patent and that said Letters Patent is hereby corrected as shown below:

Column 8,
Line 50 (claim 4, line 3), "high-surface-area" should be -- microporous --.

Signed and Sealed this

Thirtieth Day of October, 2001

Attest:

*Attesting Officer*

NICHOLAS P. GODICI
*Acting Director of the United States Patent and Trademark Office*